April 23, 1968            G. EITH            3,379,356
ARRANGEMENT FOR AN INSULATING PANEL SOLDERING DEVICE
ACCORDING TO THE FLOWSOLDER PROCESS
Filed Sept. 14, 1965

United States Patent Office 3,379,356
Patented Apr. 23, 1968

3,379,356
ARRANGEMENT FOR AN INSULATING PANEL
SOLDERING DEVICE ACCORDING TO THE
FLOWSOLDER PROCESS
Gebhard Eith, Ludwigsburg-Pleidelsheim, Germany, assignor to International Standard Electric Corporation, New York, N.Y., a corporation of Delaware
Filed Sept. 14, 1965, Ser. No. 487,274
Claims priority, application Germany, Sept. 25, 1964, St. 22,724
5 Claims. (Cl. 228—37)

ABSTRACT OF THE DISCLOSURE

The flow of solder in a dip-soldering facility is guided laterally as solder flows from a nozzle. The direction of the resulting directed flow is chosen to be in opposition to the direction of motion of a wafer being soldered. The flow of solder is supported in contact with the wafer by a body having a semi-circular cross section with the curved side upward. The leading edge of the wafer supports a flashing to prevent the flow of solder over the top of the wafer.

---

Figure 1:
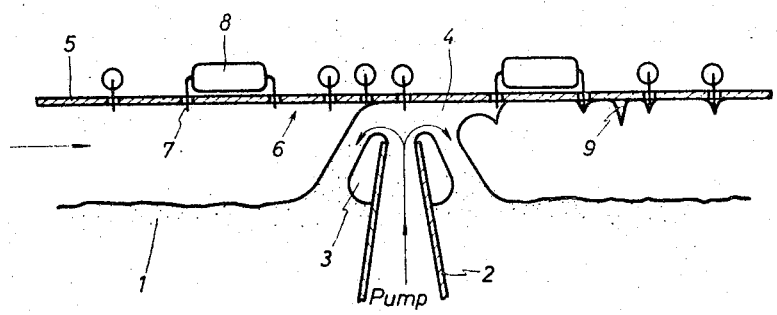

The invention relates to an arrangement concerning the nozzle of a dipping-type soldering device employing a tin flux and to means for improving the soldering properties.

It is known to solder insulating panels or conductor wafers on the top side of which electrical components are mounted and on the bottom side the conductor circuits are provided, in order to provide a proper electrical connection between the component and the conductor circuit. The soldering tin flows around the connecting means, for example the wires of the components which are put through suitable drillholes from the top side and which wires protrude somewhat at the bottom side, as well as the conductor surrounding the drillhole on said bottom side. After the soldering material has hardened the terminal means are properly connected with the corresponding conductor leads. There are various methods known to solder insulating panels. The method of dip-soldering is very advantageous and economical. The panels traverse horizontally over a stream of molten solder, being a bath or wave of fluid soldering tin, pressed vertically upward out of a nozzle through the pressure of a pump, so that the tin extrudes on either side of a flat nozzle into a "standing wave."

If now such an insulating panel passes with its bottom side over the tin wave, extruding from the nozzle, the drawback occurs that when the soldering tin runs off from the surfaces to be soldered little pins of tin remain suspending on the soldering points at the moment the tin flux is torn off. Such pins may impair a compact installation of the insulating panels into slide-in panels, cabinets and the like (danger of short-circuit), moreover, the consumption of soldering tin increases and finally the customers may object to the final appearance.

It is a primary object of the invention to eliminate the drawbacks of the arrangement known to the art. This is achieved, according to the invention, by flowing the tin off on one side.

According to a feature of the invention, the soldering tin wave flows off opposite to the moving direction of the insulating panel.

According to a further embodiment of the invention a sheet metal guide is provided on the side where the insulating panel leaves, said guide, placed onto the nozzle, is obliquely bent towards the nozzle opening and can be adjusted.

According to a further embodiment of the invention a cast iron body of semi-circular cross-section is provided on the end from which the insulating panels arrive, which body can be adjusted in the horizontal direction.

According to a further aspect of the invention, a flashing is provided on the front edge of the insulating panel or wafer while passing through the soldering tin waves, which flashing, due to its shape, prevents soldering tin from flowing onto the top side of the wafer.

Due to the arrangement according to the present invention, proper soldering, free from pins is obtained for insulating panel or wafer dip-soldering.

Proper soldering, free from such pins, could not be achieved hitherto with the dip soldering machine for larger insulating panels or wafers, because the exactness of setting, thereto required and being approximately 1 mm., cannot be kept due to warping of the wafers during the soldering process. With the aid of the new arrangement, it is possible to immerse the conductor wafer deeper (3 to 4 mm.) into the soldering tin wave without formation of pins during the soldering process.

Figure 2:
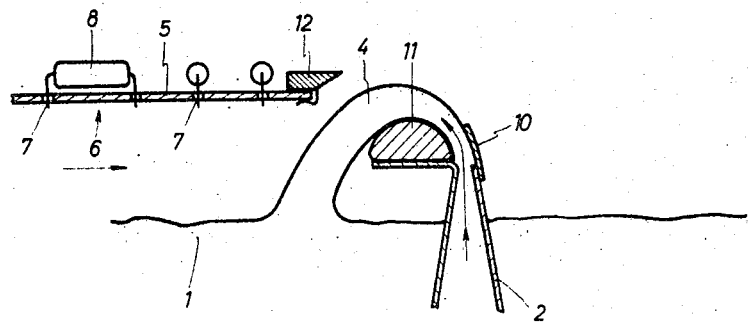

The invention is now described with the aid of a drawing, wherein:

FIG. 1 shows a cross-section through a tin bath with a nozzle known to the art, and FIG. 2 shows a cross-section through a tin bath with an arrangement of parts to control the tin wave on a nozzle according to the invention.

FIG. 1 shows the process of dip soldering in the form hitherto carried out. A nozzle 2 protrudes out of the tin bath, or source of molten solder 1, through which nozzle soldering tin flows, pumped through said nozzle. At the opening 3 of the nozzle a "standing wave" 4 of fluid tin is formed which wave uniformly flows back into the tin bath at both sides of the nozzle. Through this dipping wave the conductor wafer or panel 5 passes with its bottom side 6, whereby the protruding wires 7 of the elements 8 are soldered with the conductor leads on said bottom side 6 of such a wafer. During this process tin pins 9 occur at the surfaces to be soldered, because the fluid tin of the dipping wave 4 is carried on a little bit by the conductor wafer due to the tin flux surface tension and is not torn off sufficiently soon. Such tin accumulations form drops which harden to the shape of pins due to the quick cooling.

FIG. 2 shows the process of dip soldering according to the invention. On the nozzle 2 a metal sheet guide 10 is provided on the side the wafer leaves, said guide is bent towards the opening of the nozzle and can be adjusted. Due to said metal sheet guide 10 the tin wave 4 is directed only opposite to the moving direction of the wafer. A cast iron body 11 with semi-circular cross-section is mounted at the opening of the nozzle on the side where the wafer arrives in such a way that the tin wave 4 flows over the circular-shaped portion of the hull. Said body 1 can be adjusted in the horizontal direction. The conductor wafer 5 to be soldered or flux-coated is now passed so close over the nozzle that the tin flows with increased speed toward the bottom side 6 of said wafer. In order to prevent the tin wave spreading tin onto the top side of the conductor wafer, a flashing 12 is placed onto the front edge of the conductor wafer, and removed from said wafer after it has passed through the dip soldering process.

While the principles of the invention have been described above in connection with specific apparatus and applications, it is to be understood that this description is made only by way of example and not as a limitation on the scope of the invention.

What is claimed is:

1. An arrangement for dip soldering comprising
   a source of molten solder,
   a nozzle for directing the flow of molten solder upward, means including a deflector causing solder to flow in one direction as it wells upward from the nozzle, and means positioned under the flow of solder in the one direction to support the flow temporarily above the source of molten solder, whereby the molten solder can contact a work piece moved through the upper edge of the flow of solder.

2. An arrangement for dip soldering substantially as claimed in claim 1, in which a work piece is moved in a direction opposite to the direction of flow of the solder.

3. An arrangement for dip soldering substantially as claimed in claim 1, in which the deflector consists of a metal guide placed at one side of the nozzle and bent toward the nozzle.

4. An arrangement for dip soldering substantially as claimed in claim 1, in which the means positioned under the flow of solder includes a body of semi-circular cross-section having its semi-circular portion uppermost.

5. An arrangement for dip soldering substantially as claimed in claim 1, in which a flashing is provided for the leading edge of each work piece to prevent molten solder from flowing over the top of such workpiece.

References Cited

UNITED STATES PATENTS

| 3,039,185 | 6/1962 | Oates | 228—37 |
| 3,119,363 | 1/1964 | Rieben | 228—37 |
| 3,216,642 | 11/1965 | De Verter | 228—37 |

FOREIGN PATENTS 918,703  2/1963  Great Britain.

RICHARD H. EANES, Jr., *Primary Examiner.*

JOHN F. CAMPBELL, M. L. FAIGUS, *Examiners.*